United States Patent
Li

(10) Patent No.: US 9,274,563 B2
(45) Date of Patent: Mar. 1, 2016

(54) FOOTPAD AND CARRYING APPARATUS HAVING THE SAME

(71) Applicant: WISTRON CORP., New Taipei (TW)

(72) Inventor: Jimmy Li, New Taipei (TW)

(73) Assignee: WISTRON CORP., New Taipei (TW)

( * ) Notice: Subject to any disclaimer, the term of this patent is extended or adjusted under 35 U.S.C. 154(b) by 33 days.

(21) Appl. No.: 14/064,120

(22) Filed: Oct. 26, 2013

(65) Prior Publication Data

US 2014/0291476 A1   Oct. 2, 2014

(30) Foreign Application Priority Data

Apr. 2, 2013  (CN) .......................... 2013 2 0161223

(51) Int. Cl.

| F16M 13/00 | (2006.01) |
|---|---|
| G06F 1/16 | (2006.01) |
| A47G 29/00 | (2006.01) |
| F16M 1/00 | (2006.01) |
| F16M 3/00 | (2006.01) |
| F16M 5/00 | (2006.01) |
| F16M 7/00 | (2006.01) |
| F16M 9/00 | (2006.01) |
| F16M 11/00 | (2006.01) |

(52) U.S. Cl.
CPC ...................................... G06F 1/166 (2013.01)

(58) Field of Classification Search
CPC ......... A47B 91/04; H05K 5/0234; G06F 1/16
USPC ......... 248/616, 615, 677, 678, 683, 687, 688, 248/346.01, 188.3, 188.9
See application file for complete search history.

(56) References Cited

U.S. PATENT DOCUMENTS

| 1,367,922 | A | * | 2/1921 | Ramsey | ................. | A47B 91/04 16/42 R |
| 1,400,781 | A | * | 12/1921 | Wagner, Jr. | ............ | A47B 91/04 135/82 |
| 1,733,725 | A | * | 10/1929 | Epstein | ................... | A47B 91/04 16/42 R |
| 2,056,957 | A | * | 10/1936 | Colbridge | .............. | A47B 91/04 16/18 CG |
| 2,871,616 | A | * | 2/1959 | Sundell | ................... | A47B 91/04 248/188.3 |
| 3,025,557 | A | * | 3/1962 | Knowlton | ............ | A47B 91/066 16/42 R |
| 3,161,407 | A | * | 12/1964 | Robin | ..................... | F16F 1/024 248/570 |
| 3,426,986 | A | * | 2/1969 | Pool | ....................... | A47B 91/04 108/56.1 |
| 5,344,116 | A | * | 9/1994 | Winkler | ................... | F16M 7/00 248/188.3 |
| 5,810,038 | A | * | 9/1998 | Carpinella | ............... | A61H 3/00 135/77 |

(Continued)

FOREIGN PATENT DOCUMENTS

WO    WO 2012149271 A1 * 11/2012 ........... A47B 91/024

*Primary Examiner* — Jonathan Liu
*Assistant Examiner* — Muhammad Ijaz
(74) *Attorney, Agent, or Firm* — Li & Cai Intellectual Property (USA) Office

(57) ABSTRACT

A footpad and a carrying apparatus having the same are provided. The footpad can be applied to an electronic device to serve as a support for the electronic device. The footpad being disposed on a lower surface of the electronic device includes a hollow elastomer and a spiral structure directly formed on the inner surface of the hollow elastomer. The distance between an inner spiral portion of the spiral structure and the lower surface of the electronic device is greater than the distance between an outer spiral portion of the spiral structure and the lower surface of the electronic device. The footpad is able to physically change the shape thereof according to the weight distribution of the electronic device and provides a support force thereto so as to maintain balance and stability of the electronic device.

14 Claims, 7 Drawing Sheets

(56) References Cited

U.S. PATENT DOCUMENTS

| | | | |
|---|---|---|---|
| 5,871,199 A * | 2/1999 | Koike | F16F 1/376 248/615 |
| 5,921,516 A * | 7/1999 | Ho | A47B 91/00 248/206.5 |
| 6,301,807 B1 * | 10/2001 | Gardiner | A43B 7/142 36/155 |
| 6,371,464 B1 * | 4/2002 | Porche | F16F 1/08 148/908 |
| 6,979,778 B2 * | 12/2005 | Xiong | H05K 5/0234 174/158 R |
| 7,095,610 B1 * | 8/2006 | Banko | G06F 1/1656 248/615 |
| 7,245,484 B2 * | 7/2007 | Langerhans | G06F 1/1616 248/615 |
| 8,141,829 B2 * | 3/2012 | Hutter, III | F16B 11/006 24/304 |
| 8,213,177 B2 * | 7/2012 | Uttermann | H05K 5/0234 248/188.8 |
| 8,218,313 B2 | 7/2012 | Cheng et al. | |
| 2001/0025825 A1 * | 10/2001 | Therber | A47F 5/16 211/196 |
| 2003/0127787 A1 * | 7/2003 | Konig | E04C 5/163 267/179 |
| 2005/0217879 A1 * | 10/2005 | Xiong | H05K 5/0234 174/17 CT |
| 2008/0029664 A1 * | 2/2008 | Hsu | F16M 7/00 248/188.8 |
| 2010/0039010 A1 * | 2/2010 | Hong | D06F 39/125 312/351.3 |
| 2013/0075550 A1 * | 3/2013 | Chiu | H05K 5/0234 248/188.9 |
| 2014/0291476 A1 * | 10/2014 | Li | G06F 1/166 248/687 |
| 2015/0062810 A1 * | 3/2015 | Ho | H05K 5/0234 361/679.59 |

\* cited by examiner

FOOTPAD AND CARRYING APPARATUS HAVING THE SAME

BACKGROUND

1. Technical Field

The present disclosure relates to a footpad in particular, to a footpad having pre-press structure design and a carrying device having the same.

2. Description of Related Art

As technology progresses, notebooks are becoming to be more and more lightweight and compact. Taking Ultra-Book as an example, which only weights around 1 kg, causing the Ultra-Book prone to shake during operation and become unstable.

Along with the development of touch panel technology and the release of the Window 8 operating system, the touch-control wave for notebooks have aroused, and touchscreens have become the mandatory specification for new generation notebooks. However, when the opening angle of the display is too large, the notebook may start to tilt and become unstable as the result of unbalance weight distribution.

Stability is one of the critical design aspects for the casing of most electronic device. For instrument with high precision such as medical instrument, supporting structures with stability and anti-shock mechanism are the most critical considerations for the exterior structure. In view of U.S. Pat. No. 8,218,313, which provides a footpad design of electronic device however the invention does not provide stability and anti-shock effects therefore cannot resolve the issue of the electronic device becoming unstable and wobbly due to unbalance weight distribution.

Henceforth, the inventor believes that above mentioned problems can be improved, and through devoted research combined with application of theory, the inventor proposes a reasonable and effective design which can improve upon the above mentioned deficiencies.

SUMMARY

Accordingly, the present disclosure provides a footpad and a carrying device having the same, wherein the footpad has a spiral structure disposed therein, which can provide compression and cushioning effects so as to reduce the issue of the electronic device lifted from the desktop due to unbalance weight distribution or placed on an uneven desktop.

An exemplary embodiment of the present disclosure provides a footpad, which is adapted for disposing on a lower surface of an electronic device. The footpad includes a hollow elastomer and a spiral structure. The hollow elastomer has a carrying end and a supporting end opposite to the carrying end. The carrying end is fixedly installed on the lower surface of the electronic device. The spiral structure is directly formed on an inner surface of the hollow elastomer. The spiral structure has an inner spiral portion and an outer spiral portion surrounding the inner spiral portion, wherein the distance between the inner spiral portion and the lower surface of the electronic device is greater than the distance between the outer spiral portion and the lower surface of the electronic device.

According to one exemplary embodiment of the present disclosure, the height of the spiral structure gradually increases outwardly so that the distance between the distance between the inner spiral portion and the lower surface is greater than the distance between the outer spiral portion and the lower surface.

According to one exemplary embodiment of the present disclosure, the hollow elastomer is a bowl-shaped structure. An opening of the bowl-shaped structure is formed on the carrying end abutted against the lower surface while an outer bottom portion of the bowl-shaped structure is formed on the supporting end.

According to one exemplary embodiment of the present disclosure, the inner spiral portion is formed on an inner bottom portion of the bowl-shaped structure and provides an elastic force to the supporting end.

According to one exemplary embodiment of the present disclosure, the footpad further includes a plurality of ribs. The ribs are connected to the outer spiral portion and an inner sidewall of the footpad, respectively.

According to one exemplary embodiment of the present disclosure, the outer spiral portion is connected to an inner sidewall of the footpad.

According to one exemplary embodiment of the present disclosure, the spiral structure is a cylindrical spiral structure or a triangular spiral structure. The supporting end of the hollow elastomer has a protrusion.

An exemplary embodiment of the present disclosure provides a carrying device of an electronic device. The carrying device includes a carrying member and a plurality of footpads. The carrying member is placed at the bottom of the electronic device, while the footpads are fixedly installed on the carrying member. Each footpad includes a hollow elastomer and a spiral structure. The hollow elastomer has a carrying end and a supporting end opposite to the carrying end. The carrying end is fixedly installed on the lower surface of the carrying member. The spiral structure is directly formed on an inner surface of the hollow elastomer. The spiral structure has an inner spiral portion and an outer spiral portion surrounding the inner spiral portion. The distance between the inner spiral portion and the lower surface of the electronic device is greater than the distance between the outer spiral portion and the lower surface of the electronic device.

To sum up, the footpad of the present disclosure has a spiral structure for providing elasticity so as to have the present disclosure at least achieving the following advantageous effects. Firstly, cushioning effect can be provided to have the footpad of the electronic device maintaining physical contact with a desktop to enhance the stability of the electronic device and prevent the electronic device from becoming wobbly and unstable, thereby eliminates the issue of the footpad being unstable. Secondly, the footpads can be applied onto any electronic devices or special instruments for providing stability and anti-shock functionalities to stabilize the stand point thereof and achieve steady effect.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
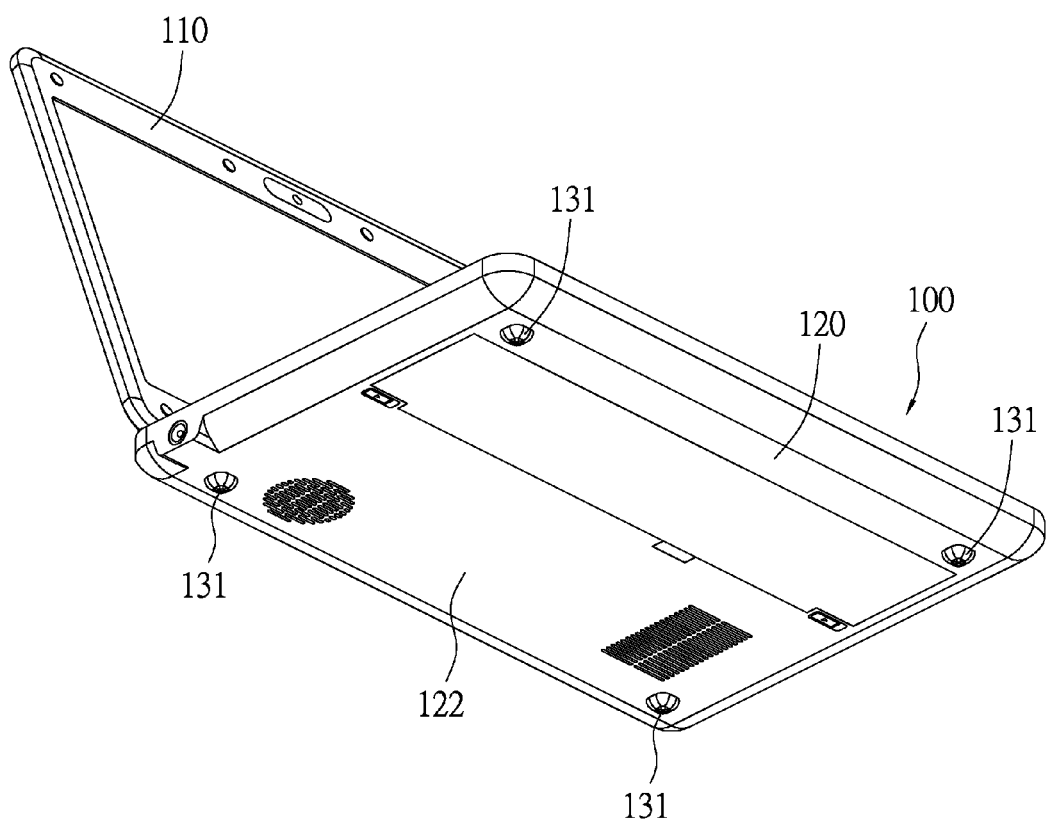
FIG. 1 is a diagram illustrating an electronic device provided in accordance to a first exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

(First Exemplary Embodiment)

Please refer to FIG. 1, which shows a diagram illustrating an electronic device provided in accordance to a first exemplary embodiment of the present disclosure. Taking the electronic device of FIG. 1 as a notebook 100 for an example, the notebook 100 has a display 110 and a computer 120. A plurality of the footpads 131 is disposed on a lower surface 122 of the computer 120. Each footpad 131 has a spiral structure disposed therein for providing an elastic force and can further compress and deform according to the weight distribution of the notebook 100 to keep the footpad 131 in contact with a desktop. Such that the issue of notebook 100 becoming wobbly and unstable when the notebook 100 is lifted from the desktop can be prevented.

Figure 2A:
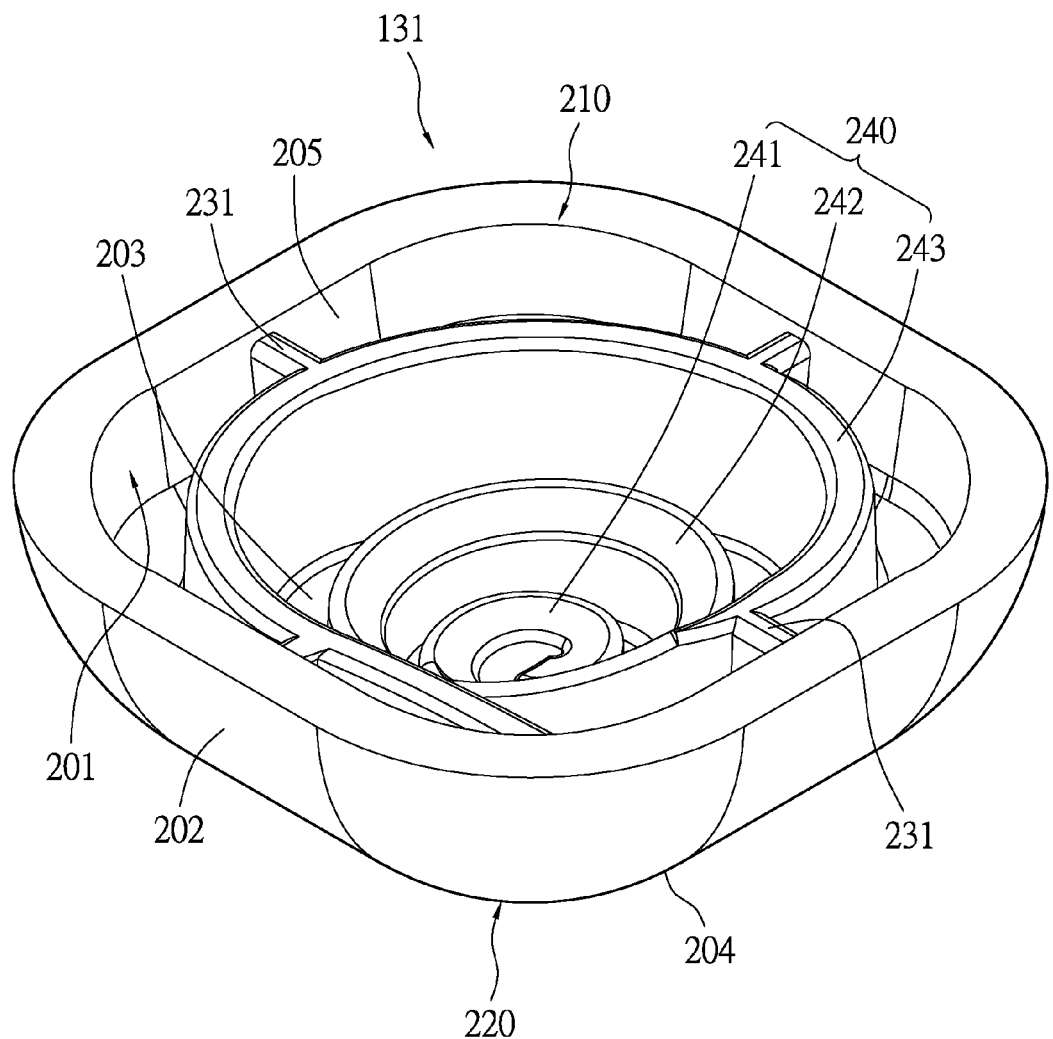
FIG. 2A is a structural diagram illustrating a footpad provided in accordance to the first exemplary embodiment of the present disclosure.
Figure 2B:
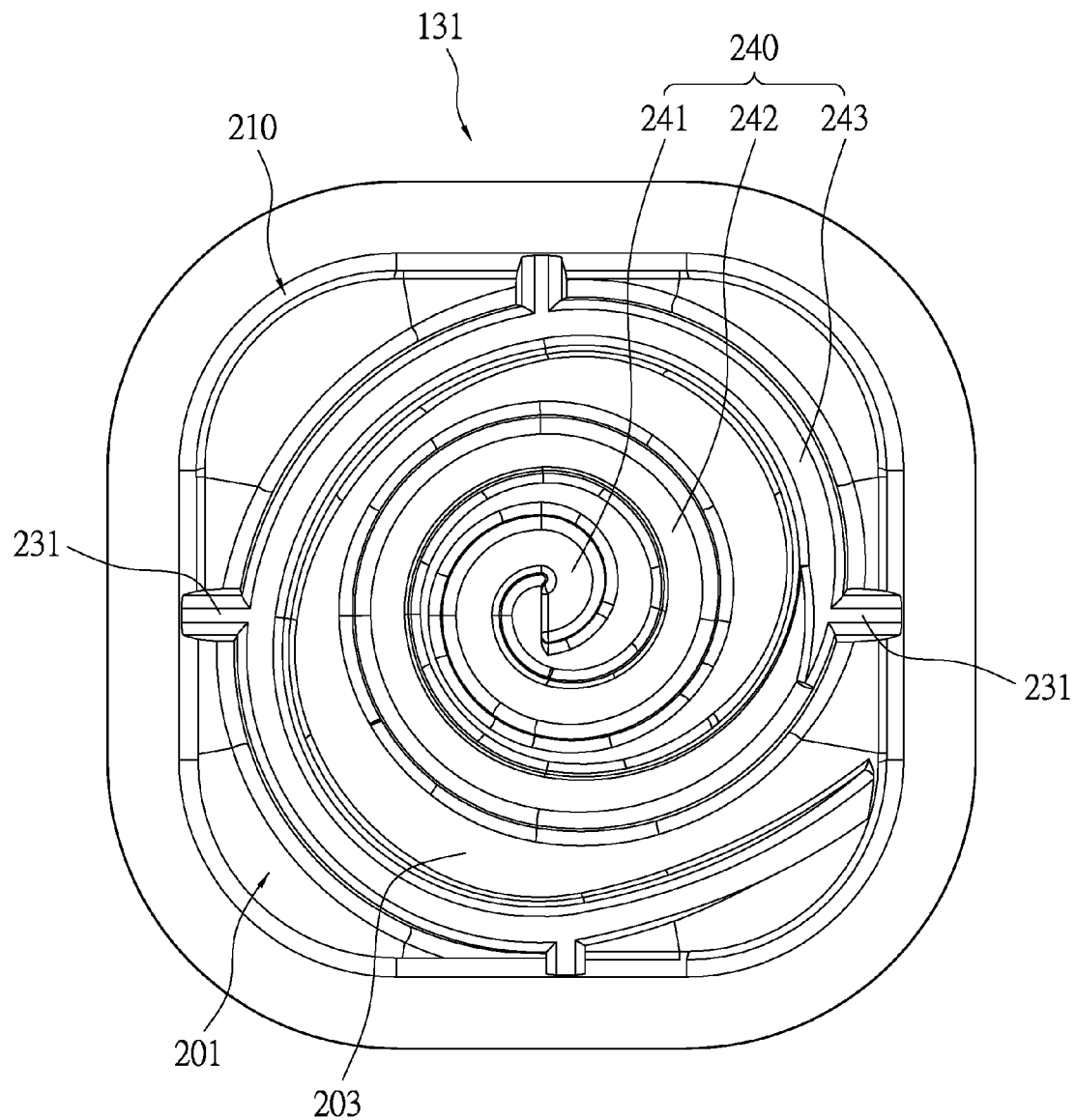
FIG. 2B is an overhead diagram illustrating the footpad provided in accordance to the first exemplary embodiment of the present disclosure.

Please refer FIG. 2A and FIG. 2B at the same time. FIG. 2A shows a structural diagram illustrating the footpad 131 provided in accordance to the first exemplary embodiment of the present disclosure. FIG. 2B shows an overhead diagram illustrating the footpad 131 provided in accordance to the first exemplary embodiment of the present disclosure. The footpad 131 is a hollow elastomer of a bowl-shaped structure. The hollow elastomer has a carrying end 210 and a supporting end 220. The opening of the bowl-shaped structure has an opening thereof formed on the carrying end 210 and an outer bottom portion 204 thereof being the supporting end 220. The bowl-shaped structure has an inner surface 201 and an outer surface 202. The inner surface 201 of the bowl-shaped structure is divided into an inner sidewall 205 and an inner bottom portion 203. The inner side wall 205 is the sidewall of the inner surface 201 of the bowl-shaped structure. The inner bottom portion 203 is the inner bottom portion of the bowl-shaped structure. The outer bottom portion 204 is the outer bottom portion of the bowl-shaped structure and is formed on the supporting end 220. The carrying end 210 is fixedly installed on the lower surface 122 of the electronic device 100. That is the opening of the footpad 131 is fixedly installed on the lower surface 122 of the electronic device 100.

The footpad 131 has a spiral structure 240 disposed therein which is directly formed on the inner bottom portion 203 of the inner surface 201 of the hollow elastomer 203. The spiral structure 240 is a low inside and high outside structure. As shown in FIG. 2B, the top of the spiral gradually increases outwardly to become closer to the opening of the footpad 131. Because of the changes in spiral height, the spiral structure 240 can be divided into an inner spiral portion 241 and an outer spiral portion 243 surrounding the inner spiral portion 241. In the instant embodiment, the outermost spiral is defined as the outer spiral portion 243, while the innermost spiral is defined as the inner spiral portion 241. As can be noted from FIG. 2A, the top of the inner spiral portion 241 is more distant from the opening of the footpad 131 than the top of the outer spiral portion 243. Accordingly, the distance between the inner spiral portion 241 and the lower surface 122 of the electronic device 100 is greater than the distance between the outer spiral portion 243 and the lower surface 122 of the electronic device 100.

In the instant embodiment, the spiral structure 240 includes three spirals i.e., the inner spiral portion 241, spiral 242, and the outer spiral portion 243. The inner spiral portion 241 is disposed at the central portion of the footpad 131. The height of the spiral structure 240 gradually increases outwardly so that the distance between the inner spiral portion 241 and the lower surface 122 is greater than the distance between the outer spiral portion 243 and the lower surface 122.

It is worth to note that in another embodiment, the inner spiral portion 241 may include two inner spirals and the outer spiral portion 243 is the outermost spiral. The actual definition and configuration of the inner spiral portion 241 and the outer spiral portion 243 may depend upon the design requirements so long as the design satisfies the condition that the distance between the inner spiral portion 241 and the lower surface 122 of the electronic device 100 is greater than the outer spiral portion 243 and the lower surface 122 of the electronic device 100, however the instant embodiment is not limited thereto.

The footpad 131 further includes a plurality of ribs 231. The ribs 231 are connected to the outer spiral portion 243 and the inner sidewall 205, respectively so as to strengthen the structural strength of the spiral structure 240. The tail of the outer spiral portion 243 may also connect to the inner sidewall 205 of the footpad 131 to strengthen the structural strength of the spiral structure 240.

Figure 3A:
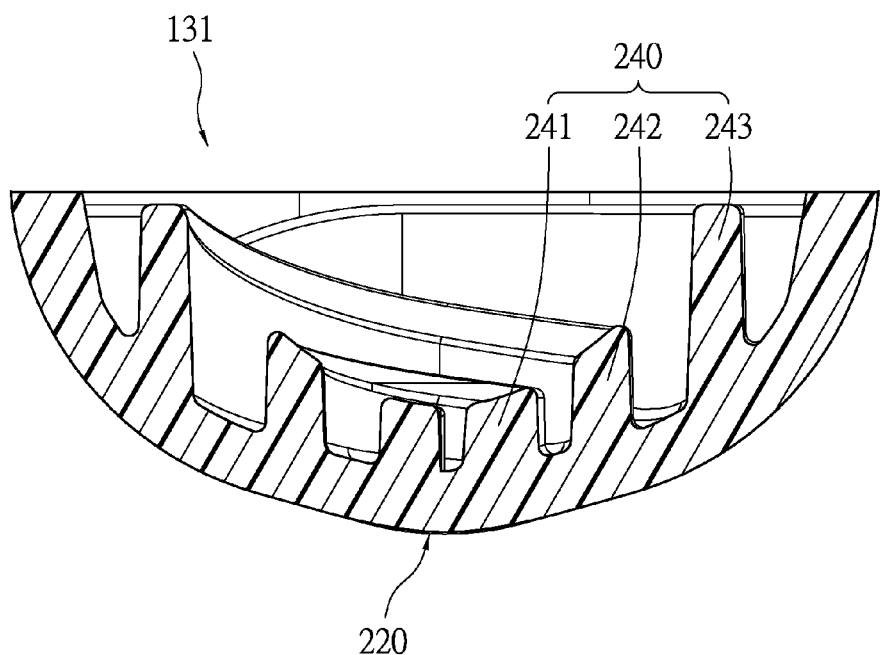
FIG. 3A is a sectional diagram illustrating the footpad provided in accordance to the first exemplary embodiment of the present disclosure.
Figure 3B:
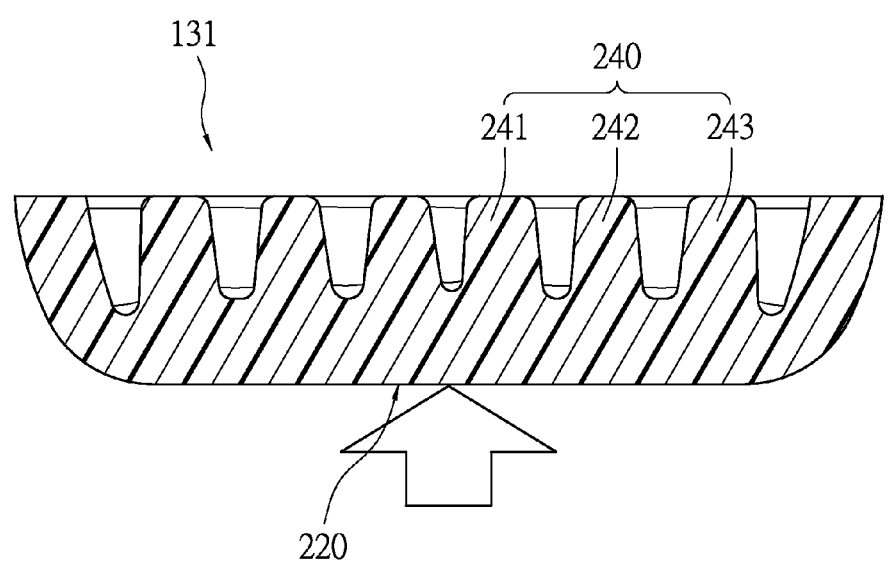
FIG. 3B is a sectional diagram illustrating the operation of the footpad under force provided in accordance to the first exemplary embodiment of the present disclosure.

Please refer to FIG. 3A and FIG. 3B. FIG. 3A shows a sectional diagram illustrating the footpad 131 provided in accordance to the first exemplary embodiment of the present disclosure. FIG. 3B shows a sectional diagram illustrating the operation of the footpad 131 under force provided in accordance to the first exemplary embodiment of the present disclosure. The spiral structure 240 and the footpad 131 are formed as one single structure similar to a spring and can provide the elastic force to the supporting end 220 of the footpad 131. When the supporting end 220 is under compression, the shape of footpad 131 may deform by extrusion. As shown in FIG. 3B, the footpad 131 and the spiral structure 240 formed therein may deform under compression and generate supporting force to the supporting end 220, accordingly. Additionally, when the exerted force is relatively large, the deformation of the spiral structure 240 may causes the inner spiral portion 241 to abut upward against the lower surface 122 of the electronic device 100 so as to generate the supporting force.

It is worth to note that the spiral structure 240 described herein may be a cylindrical spiral structure or a triangular spiral structure so long as the spiral structure 240 may provide the elastic force to the bottom (i.e., the supporting end 220), and the instant embodiment is not limited thereto. The material of the footpad 131 may be rubber or plastic which can deform under compression while provide the elastic force to the desktop however, the instant embodiment does not limit the material for the footpad 131.

Since the footpad 131 may deform and generate the supporting force according to the force exerted thereon, therefore when the weight distribution of the notebook 100 become imbalance when open the display 110, the footpads 131 arranged underneath deform according to the weight exerted so as to maintain in contact with desktop. Such that the problem of having a portion of the notebook 100 or a footpad thereof being lifted from the desktop causing the notebook 100 to wobble and become shaky may be effectively avoided.

Moreover, the footpad 131 has the spiral structure 240 disposed therein may also generate cushioning effect for resolving the issues of the notebook 100 being tilted or being placed on uneven desktop. It is worth to note that the exact number and the arrangement of footpad 131 on the notebook 100 may be configured according to the needs, and the present disclosure is not limited thereto. Additionally, the footpad 131 of the instant embodiment may be applied to various types of electronic devices including but not limited to desktop computers, tablets, displays, and medical instruments. Particularly, the footpad 131 may be disposed on the lower surface of the electronic device forming a carrying device so as to enhance the stability of the electronic device.

(Second Exemplary Embodiment)

Figure 4:
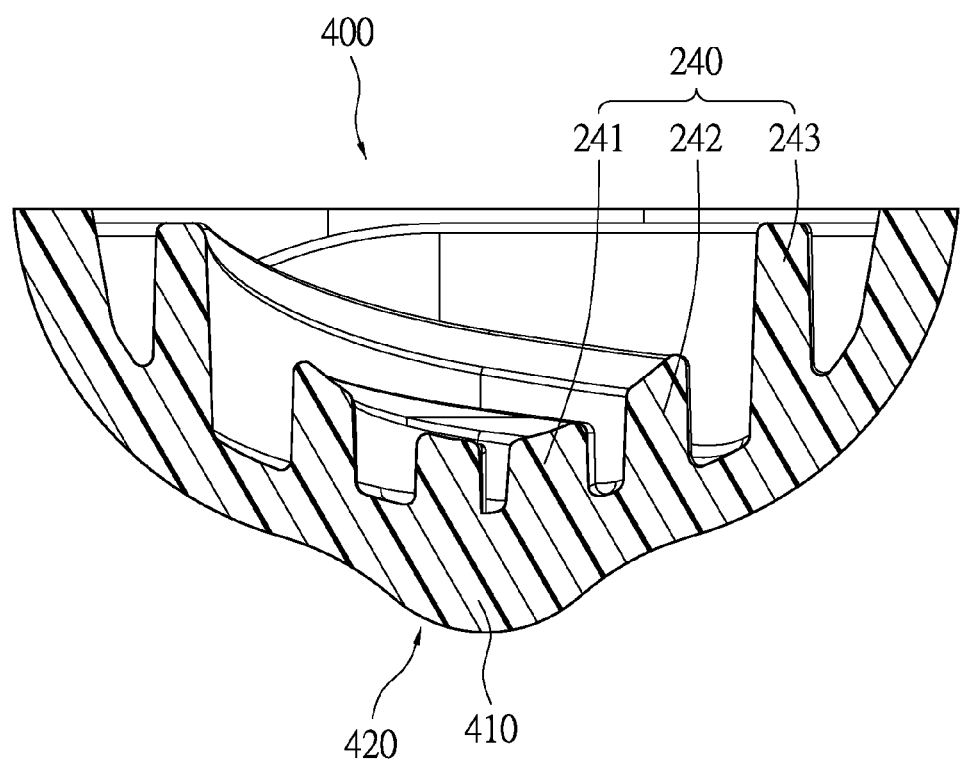
FIG. 4 is a sectional diagram illustrating a footpad provided in accordance to a second exemplary embodiment of the present disclosure.

Please refer to FIG. 4, which shows a sectional diagram illustrating a footpad provided in accordance to a second exemplary embodiment of the present disclosure. The structure of the aforementioned footpad 131 as shown in FIG. 4 can be slightly modified to enhance the supporting force. The main structural difference between the footpad 131 and a footpad 400 is in that a supporting end 420 of the footpad 400 includes a protrusion 410. The protrusion 410 can enhance the compression depth of the spiral structure 240 as well as increase the downward elastic force. It can be noted from FIG. 4 and FIG. 3A that the internal structural of the footpad 400 is essentially the same as the internal structure of the footpad 131 i.e., both have the spiral structure 240 disposed therein to provide bottom support and cushioning effect. The outer bottom portion of the footpad 400 further has the protrusion 410 protruded downward therefrom to strengthen the supporting ability. Additionally, as the footpad 400 having the protrusion enhance the compression depth such that the occurrence of the bottom of the notebook 100 being suspended may be reduced. In terms of structural, the protrusion described herein may be a cylindrical protrusion, a pyramidal protrusion, or a downward planar protrusion, however, the present disclosure is not limited thereto.

(Third Exemplary Embodiment)

Figure 5:
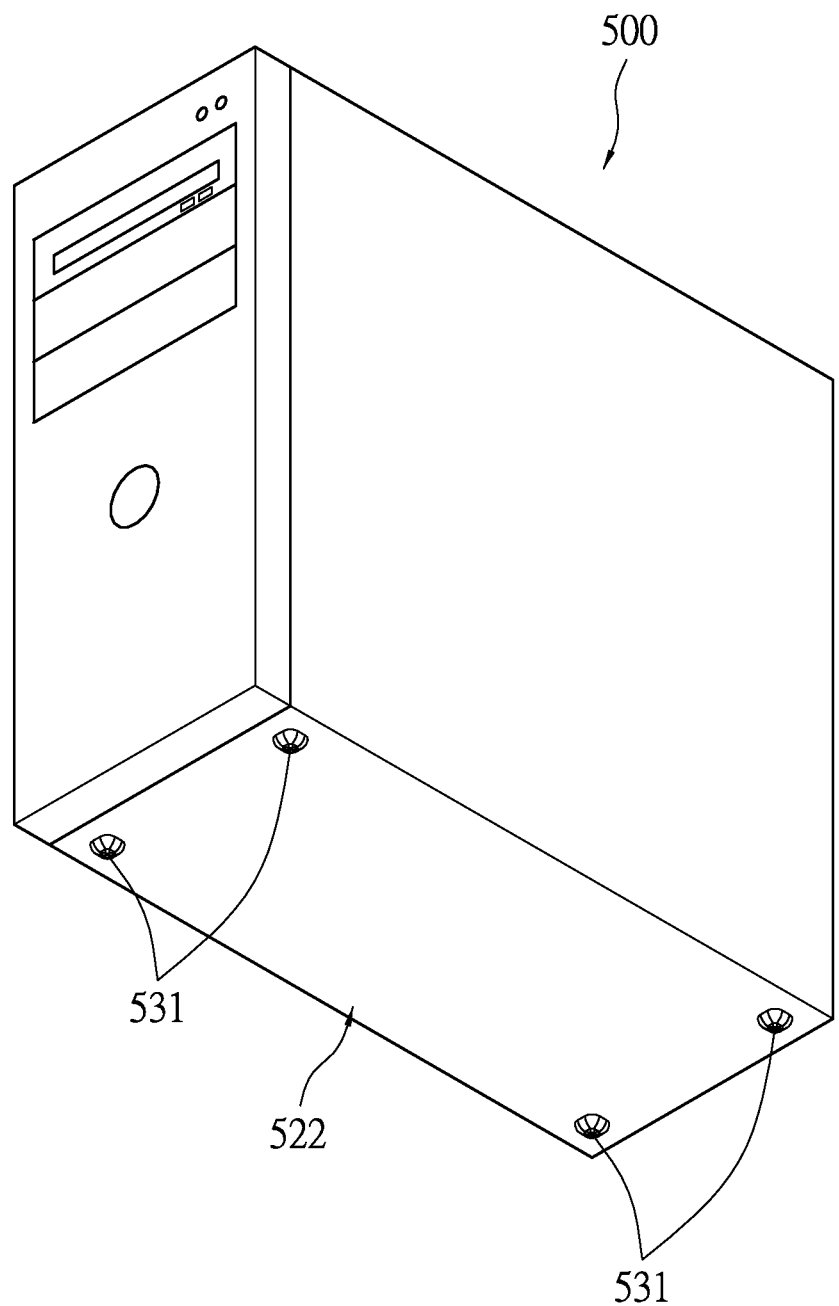
FIG. 5 is a diagram illustrating a computer provided in accordance to a third exemplary embodiment of the present disclosure.

The aforementioned footpads 131 and 400 may be applied to the bottoms of various electronic devices such as desktop computers or servers. Please refer to FIG. 5, which shows a diagram illustrating a computer provided in accordance to a third exemplary embodiment of the present disclosure. A lower surface 522 of the computer 500 has a plurality of footpads 531 e.g., four footpads disposed thereon, however the instant embodiment does not limit the number of the footpads disposed. The structure of each footpad 531 is essentially the same as the structures of the footpad 131 and 400. The footpads 531 may provide cushioning effect to the computer 500. Specifically, when the weight distribution of the computer 500 becomes imbalance, the footpads 531 may compress to provide supporting forces as well as height balance so as to eliminate the issue of instability as result of when a footpad of the computer 500 being lifted up from the desktop.

(Fourth Exemplary Embodiment)

Figure 6:
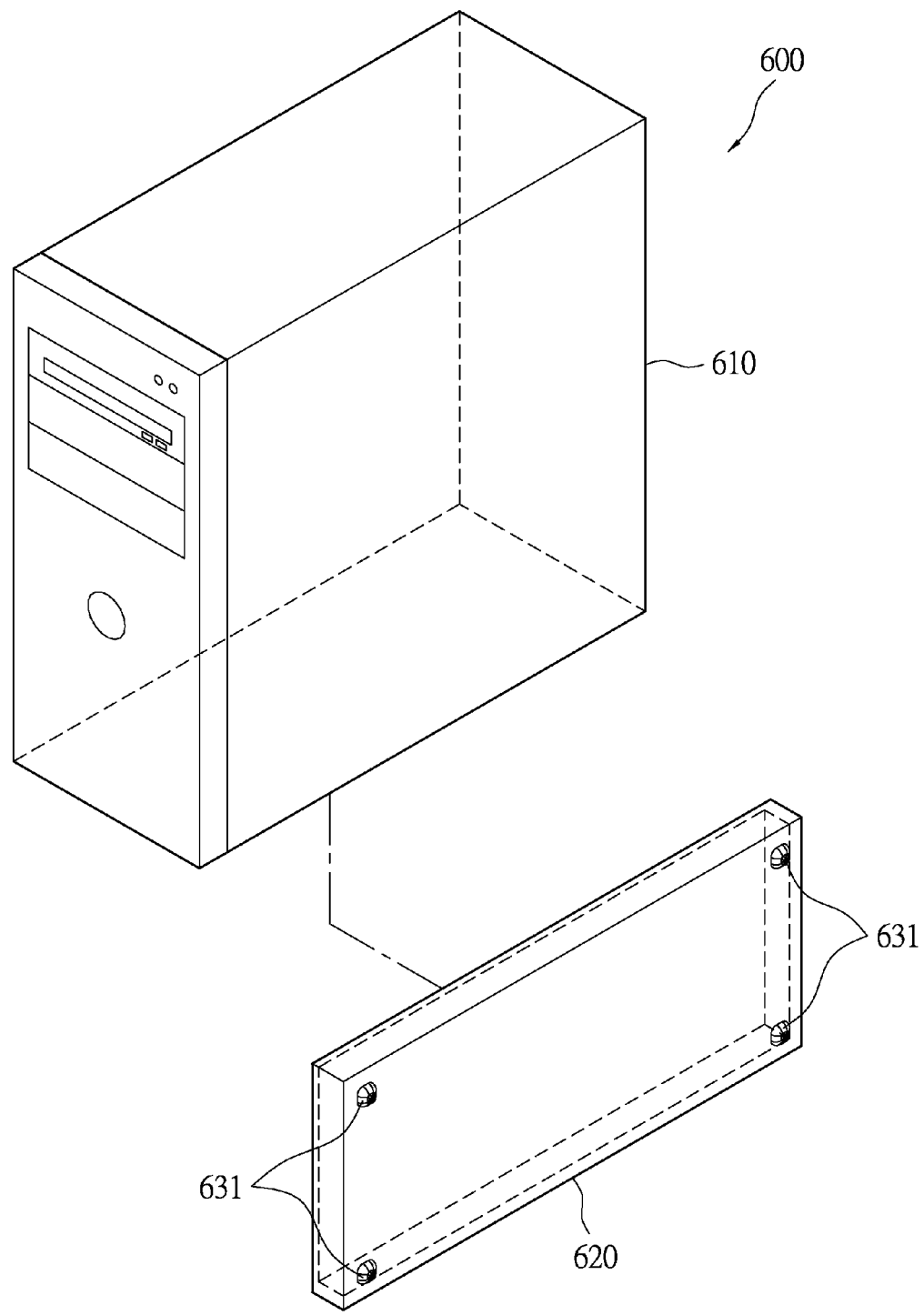
FIG. 6 is a diagram illustrating a carrying device provided in accordance to a fourth exemplary embodiment of the present disclosure.

Please refer of FIG. 6, which shows a diagram illustrating a carrying device provided in accordance to a fourth exemplary embodiment of the present disclosure. The footpad of the instant disclosure may be directly disposed on a bottom of a carrying member 620. The carrying member 620 can have an electronic device 610 placed thereon, wherein the electronic device 610 may include but not limited to a notebook, a computer, a server, and a medical instrument. The carrying member 620 and the footpad 631 may form a carrying device 600 for the electronic device 610. The carrying device 600 may be used for carrying or placing the electronic device 610 and provide stable operating environment for the electronic device 610. Additionally, it is worth to note that in one embodiment, the carrying member 620 may directly integrate with a lower casing of the computer 610, however, the present disclosure is not limited thereto. A lower surface of the carrying member 620 may has a plurality of footpads 631 disposed thereon. Each of footpads 631 may be a hollow elastomer having a spiral structure disposed therein. The spiral structure is directly formed on an inner surface of the hollow elastomer, wherein the spiral structure has an inner spiral portion and an outer spiral portion surrounding the inner spiral portion. The distance between the inner spiral portion and the lower surface of the carrying member 620 is greater than the distance between the outer spiral portion and the lower surface of the carrying member 620. The structure of the footpad 631 is essentially the same as the structure of footpad 131 or footpad 400, and further descriptions are hereby omitted.

In summary, the aforementioned footpads 131, 400 and the carrying device 600 may provide different supporting force and cushioning space when the weight distribution of the electronic device is imbalance. Accordingly, the instability issue of an electronic device becomes wobbly when a footpad thereof is lifted may be avoided. Additionally, the footpad disclosed by the present disclosure further has cushioning capability such that the electronic device equipped with the footpad has anti-shock ability. Moreover, the structure of footpad disclosed by the present disclosure may reduce the issue of a portion of the electronic device being lifted from the desktop when the electronic device is placed on an uneven desktop.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A footpad fixedly installed on a carrying member, comprising:
   a hollow elastomer, having a carrying end and a supporting end opposite to the carrying end, wherein the carrying end has a contacting surrounding surface for defining a reference plane, an inner surface provided on the supporting end; and
   a spiral structure, having an inner spiral portion and an outer spiral portion wherein the inner spiral portion and the outer spiral portion are directly formed on the inner surface of the hollow elastomer, and the outer spiral portion surrounding the inner spiral portion, wherein the spiral structure and the hollow elastomer are formed as one single structure, the distance between the inner spiral portion and the reference plane is greater than the distance between the outer spiral portion and the reference plane; wherein the spiral structure deforms under a compression so that the inner spiral portion abuts upward against a lower surface of the carrying member.

2. The footpad according to claim 1, wherein the height of the spiral structure gradually increases outwardly so that the distance between the inner spiral portion and the reference plane is greater than the distance between the outer spiral portion and the reference plane.

3. The footpad according to claim 1, wherein the hollow elastomer is a bowl-shaped structure, an opening of the bowl-shaped structure formed on the carrying end abutted against the reference plane, an outer bottom portion of the bowl-shaped structure formed on the supporting end.

4. The footpad according to claim 3, wherein the inner spiral portion is formed on an inner bottom portion of the bowl-shaped structure and provides an elastic force to the supporting end.

5. The footpad according to claim 1, further comprising:
a plurality of ribs, connected to the outer spiral portion and an inner sidewall of the footpad, respectively.

6. The footpad according to claim 1, wherein the spiral structure is a cylindrical spiral structure or a triangular spiral structure.

7. The footpad according to claim 1, wherein the supporting end of the hollow elastomer has a protrusion.

8. A carrying device of an electronic device, comprising:
a carrying member, for placing the electronic device; and a plurality of footpads, fixedly installed on the carrying member, wherein each footpad comprises:
a hollow elastomer, having a carrying end and a supporting end opposite to the carrying end, the carrying end being fixedly installed on a lower surface of the carrying member, an inner surface provided on the supporting end; and
a spiral structure, having an inner spiral portion and an outer spiral portion wherein the inner portion and the outer portion are directly formed on the inner surface of the hollow elastomer, and the outer spiral portion surrounding the inner spiral portion;

wherein the spiral structure and the hollow elastomer are formed as one single structure, the distance between the inner spiral portion and the lower surface of the carrying member is greater than the distance between the outer spiral portion and the lower surface of the carrying member; wherein the spiral structure deforms under a compression so that the inner spiral portion abuts upward against the lower surface of the carrying member.

9. The carrying device according to claim 8, wherein the height of the spiral structure gradually increases outwardly so that the distance between the inner spiral portion and the carrying member is greater than the distance between the outer spiral portion and the carrying member.

10. The carrying device according to claim 8, wherein the hollow elastomer is a bowl-shaped structure, an opening of the bowl-shaped structure formed on the carrying end, an outer bottom portion of the bowl-shaped structure formed on the supporting end.

11. The carrying device according to claim 8, wherein the inner spiral portion is formed on an inner bottom portion of the bowl-shaped structure and provides an elastic force to the supporting end.

12. The carrying device according to claim 8, further comprising:
a plurality of ribs, connected to the outer spiral portion and an inner sidewall of the footpad, respectively.

13. The carrying device according to claim 8, wherein the spiral structure is a cylindrical spiral structure or a triangular spiral structure.

14. The carrying device according to claim 8, wherein the supporting end of the hollow elastomer has a protrusion.

* * * * *